Aug. 26, 1958     H. S. YOUNG     2,849,299
METHOD OF CHEM-MILLING HONEYCOMB STRUCTURES
Filed Aug. 31, 1956
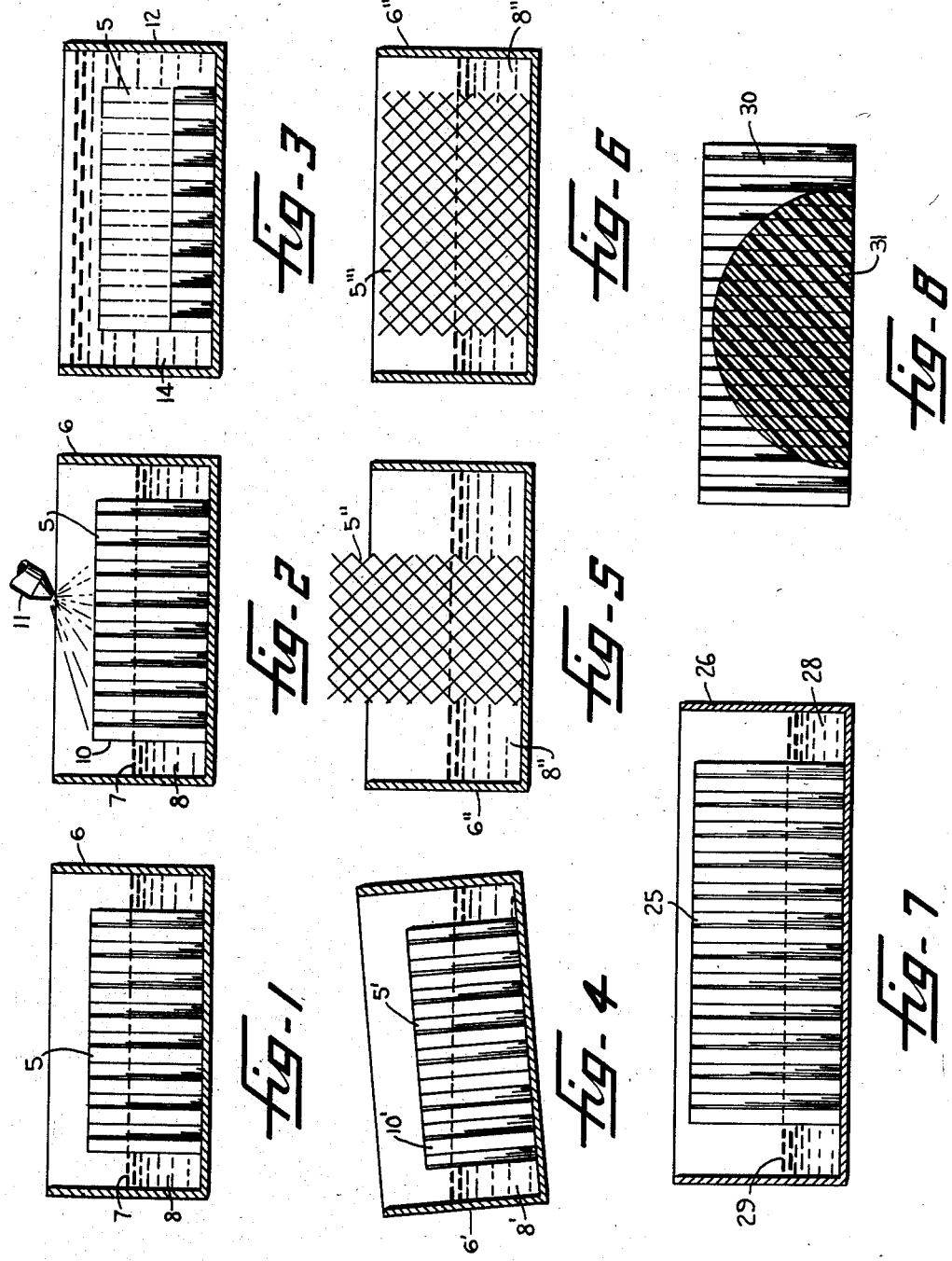
INVENTOR.
H. S. YOUNG
BY
ATTORNEY

United States Patent Office 2,849,299
Patented Aug. 26, 1958

2,849,299

METHOD OF CHEM-MILLING HONEYCOMB STRUCTURES

Harold S. Young, Chula Vista, Calif.

Application August 31, 1956, Serial No. 607,320

6 Claims. (Cl. 41—43)

The present invention relates to chemical etching milling processes known as chem-milling, and more particularly to a chem-milling process for light metal cellular structures employed in the aircraft industry and referred to generally as metallic honeycomb. The process includes chem-milling honeycomb structures of various shapes used in making aircraft wing sections and different fuselage parts of various shapes and curvature.

One object, is to provide a process for chem-milling honeycomb structures which consumes a comparatively small amount of time with a high degree of accuracy and prevents the cellular honeycomb structure from being deformed or mutilated, which is usually the case when cellular honeycomb structures are machined to form the required shape and curvature.

Another object, is to provide a process of chem-milling metallic honeycomb structures in which the honeycomb unit is placed in a tank partially filled with water to a level along a line coincident with a mark on the honeycomb structure designating the portion to be milled so that the masking material can be applied to the exposed portion in such a manner that the honeycomb will be accurately masked to cover the portion of the honeycomb structure to be protected during the etching step.

Another object, is to provide a chem-milling process for honeycomb structures in which the receptacle containing the body of water in which the honeycomb structure is inserted can be tilted so that the water level will seek an angular position with respect to the honeycomb structure and enable the same to be masked along a diagonal line and thus produce shapes of triangular or wedge-shaped configuration.

Another object, is to provide a chem-milling process for honeycomb structures in which the honeycomb structure is first coated exteriorly and interiorly with a tacky substance and is then placed in a receptacle containing water having a level equal to the level of the portion to be etched away so that the protruding portion of the honeycomb structure can be coated with an acid-resist prior to its deposition in an etchant solution.

Another object, is to provide a process for chem-milling honeycomb structures in which the honeycomb structure can be chem-milled along its ends, sides and other portions as well as the top and bottom areas thereof.

Another object, resides in the provision of a chem-milling process in which the honeycomb structure may be masked along certain areas by immersing the honeycomb structure in liquid wax to provide an acid-resist for various portions of the honeycomb structure and along a prescribed line indicated by a mark on the honeycomb structure so that the honeycomb structure will be masked interiorly and exteriorly along a predetermined plane and permit the unmasked portion to be removed by etching when the coated honeycomb structure is placed in an aqueous etching solution.

Another object, is to provide a chem-milling process for honeycomb structures in which certain portions along an irregular line or curvature may be masked by inserting a solid wax form of the desired shape into the honeycomb structure unit and pressing the same therein by inserting the teeth of a tamping comb into the cells and pressing the wax into the desired position, after the honeycomb structure has been pushed downwardly on the geometrical wax figure.

It has been found that when honeycomb structures have been machined to form a surface or edge area of irregular shape or along a straight line by grinding or the like, that the thin metal walls of the cellular structure are frequently bent and mutilated causing the thin metal to pull apart at certain areas and thus weakening the entire structure. Attempts have been made to remedy this, but such practice is expensive and time consuming.

The above disadvantages are overcome by chem-milling honeycomb structures along a predetermined line to prevent the thin metal walls of the honeycomb structure from being mutilated and the honeycomb unit from being deformed and weakened.

Other objects and advantages of the invention will become apparent during the course of the following description of the accompanying drawing, wherein:

Figure 1 is a diagrammatic view showing a honeycomb unit after it has been coated with a tacky substance placed in a tank of water with the water level line coinciding with the line of cut or metal to be removed.

Figure 2 is a diagramamtic view similar to Figure 1 showing the manner in which the exposed tacky portion of the honeycomb structure is sprayed with powdered metal to form an acid-resist on the exposed portion of the honeycomb structure.

Figure 3 is a diagrammatic view showing the manner in which the masked honeycomb structure is immersed in an etchant tank to remove the unmasked portions of the honeycomb structure.

Figure 4 is a diagrammatic view similar to Figure 1 but showing the manner in which the water level may be made to assume various positions with respect to the honeycomb structure.

Figure 5 is a diagrammatic view similar to Figure 1 but showing the honeycomb unit placed on end for masking certain end portions of the cellular structure.

Figure 6 is a diagrammatic view similar to Figure 5 but showing the honeycomb structure on its side for the purpose of masking areas along the side edges of the unit.

Figure 7 is a diagrammatic view of a modified form of the invention in which the honeycomb structure is masked by liquid wax to coat various areas along a horizontal plane while leaving the unsubmerged portion above the plane unmasked for chem-milling, and Figure 8 is a further modified form of the invention illustrating diagrammatically the manner in which certain areas of the honeycomb structure can be masked by solid wax-like bodies of various geometrical forms.

The chem-milling process for honeycomb structures is carried out as shown in the various steps in the diagrammatic views in the drawing and the honeycomb structure is of conventional form and is constructed of relatively thin strips of aluminum foil which are interlocked to form a series of substantially rectangular cells between the interlocked foil strips. As an example, the honeycomb structure may be of block-like form 5 shown in Figure 1, and said honeycomb unit 5 is coated both interiorly and exteriorly with a tacky substance or composition such as shellac or the like to completely cover all of the surfaces thereof. This can be carried out by immersing the honeycomb unit 5 in a tank of sufficient depth filled with shellac to cover the unit 5 and completely coat the same. After the honeycomb unit 5 is coated with shellac it is placed in a receptacle 6 and marked with an indicating mark such as a scratch or the like denoting a line along which the chem-milling is to take place. The vat or container 6 is then filled with water to the mark indicating the point that the unit is to be chem-milled, and said water will seek a level 7 in the vat on a true horizontal plane coincident with the plane that the honeycomb unit is to be milled. The water 8 in the tank 6 may be supplied thereto by suitable controlled means such as a valved pipe connected to a suitable water supply.

While the honeycomb unit 5 is still in the tank 6 as shown in Figure 2, the exposed portion 10 is sprayed by means of a spray gun or the like having a nozzle 11 with a powdered metal of a fineness of from one to two thousand per inch screen size. The powdered metal is sprayed on all areas of the exposed portion 10 of the honeycomb unit 5 so as to completely cover the exterior portion thereof as well as the cell walls. The powdered metal adheres to the tacky coating on the exposed portion 10 of the honeycomb unit 5, but does not coat the portions below the liquid level 7 of the water 8. Thus, there is provided a masked portion on a substantially horizontal plane with the remaining portion of the unit 5 submerged in the water 8 unmasked. The honeycomb unit is then removed and if desired, may be dried to permit the hardening of the tacky shellac and the assurance that the powdered metal will adhere to the sprayed portions thereof. Various powdered metals may be used such as bronze and copper and alloys including copper, nickel and the like.

After the honeycomb unit 5 has been dried it is removed from the tank 6 in Figure 2 and placed in an etchant tank 12 as shown in Figure 3 and filled with an aqueous etchant solution of substantially equal parts of nitric muriatic acid with an equal amount of water. Good results are obtained by using 50% nitric acid, 50% muriatic acid and an equal amount of water. Other etching solutions which can be used are caustic soda which attacks the aluminum foil and because of its thin section has a rapid etching rate. Other aqueous etching solutions can be used such as a 5% to 20% solution of hydrochloric acid.

The honeycomb structure 5 is left in the tank 12 in the etchant solution 14 for a time period of from one to five minutes, and because of the relatively thin section of the aluminum foil from which the honeycomb structure is made, the etching will take place rapidly and the heat produced by the chemical reaction will not affect the coated or masked portion of the honeycomb structure.

In the modified form of the invention shown in Figure 4 the honeycomb structure 5' is coated with shellac and is marked with a line or lines designating the point at which the honeycomb unit is to be chem-milled. The unit is then placed in a tank 6' if the line is at an angle, and said tank is tilted by elevating the same with the use of Johannsen blocks to tilt the receptacle 6' on the proper angle. The tank 6' then is filled with water 8' until the water level reaches the marking on the honeycomb unit 5'. The exposed portion 10' of the honeycomb structure is then sprayed with powdered metal as shown in Figure 2 and is next submerged in an aqueous etching bath as shown in Figure 3.

When it is desired to chem-mill a honeycomb unit 5" along one edge as shown in Figure 5, the unit is placed on its end edge in a tank 6" after being marked and the tank is then filled with water 8" until the water level reaches the mark on the workpiece or honeycomb structure. While in this position the honeycomb structure is sprayed with powdered metal as shown in Figure 2 and is next subjected to the etching bath by being immersed in an aqueous etching solution 14 as shown in Figure 3.

The honeycomb unit can also be chem-milled longitudinally and as shown in Figure 6 the honeycomb unit 5''' is first thoroughly coated with a tacky substance such as shellac and is then placed in the tank 6''' on its side.

The tank is then filled with water until the liquid level reaches the mark on the honeycomb structure indicating the line to be chem-milled. As before, the projecting upper portion of the honeycomb structure is coated with powdered metal as set forth in the step shown in Figure 2 and is then removed and placed in the etchant tank 5 and subjected to the aqueous etching bath 14 by immersion therein.

In the modified form of the invention show in Figure 7 the honeycomb unit 25 is marked by the machinist along the line where the honeycomb structure is to be chem-milled and is then placed in a tank 26 as shown in Figure 7. Liquid wax 28 is then supplied to the tank by any suitable means so that the liquid level rises slowly until the level 29 coincides with the marks on the honeycomb structure 25. The tank 26 may be tilted as shown in Figure 4 when it is desired to mask an area of the honeycomb structure in a diagonal plane with respect to the top edge thereof. The honeycomb structure with portions masked by the liquid wax 28 is then immersed in the etchant solution in the tank 12 shown in Figure 3.

In the modified form of the invention shown in Figure 8 the honeycomb structure 30 is of conventional design and is constructed in the same manner as described in connection with the form of the invention shown in Figures 1 to 3 inclusive.

In the form of the invention shown in Figure 8 a wax-like body of a predetermined configuration corresponding to the configuration of the workpiece desired is molded or otherwise shaped and formed of solidified wax. As indicated in Figure 8 the wax form 31 is of half-round section and may extend transversely with respect to the honeycomb structure 30. In this embodiment, the solidified wax body 31 is placed upon a table or support and the honeycomb structure 30 is centered thereabove and pressed downwardly until the solidified wax form fills in the cellular areas to be masked. After the wax-like form is inserted in the honeycomb structure it may be tamped from the top by means of a comb-like device having teeth arranged in closely spaced relation so as to pass into the individual cells and engage the upper surface of the wax body and thus tamp the same more firmly in place.

The unmasked area to be chem-milled may then easily be removed by placing the honeycomb structure 30 in the etchant tank 12 as before and immersing the same in the aqueous etchant solution 14.

It is to be understood that the forms of the invention herewith shown and described are to be taken as preferred embodiments of the same, and that various changes in the shape, size and arrangement of vats and tanks may be resorted to without departing from the spirit of the invention or the scope of the subjoined claims.

What I claim is:

1. In a chem-milling process for honeycomb structures, the steps of coating the entire honeycomb structure with a tacky substance, placing the honeycomb structure in a tank of water with the liquid level coinciding with a plane along a line where it is desired to remove portions of the honeycomb structure, spraying the projecting portion of the honeycomb structure with an etching acid-resist, removing the masked honeycomb structure and finally immersing the same in an aqueous etchant bath.

2. In a chem-milling process for honeycomb structures, the steps of coating the honeycomb structure with a tacky substance over its entire area, placing said honeycomb structure in liquid so that the liquid level coincides with a plane extending through the honeycomb structure to be chem-milled and the remaining portion of the honeycomb structure extending above the liquid level, coating the protruding portion of the honeycomb structure with an etchant acid-resist and finally immersing the honeycomb structure in an aqueous acid etchant solution.

3. In a chem-milling process for honeycomb structures, the steps of coating the honeycomb structure over its entire area with a tacky substance, placing the honeycomb structure in water so that the liquid level coincides with a plane extending through the structure to be chem-milled, spraying powdered metal on the projecting portion of the honeycomb structure and finally removing said honeycomb structure and immersing the same in an aqueous etchant solution.

4. In a chem-milling process for honeycomb structures, the steps of coating said honeycomb structure with a tacky substance, placing the honeycomb structure in water so that the liquid level corresponds to a plane extending through the honeycomb structure, tilting the honeycomb structure so that said plane will be at an angle to the cellular ends of the honeycomb structure, coating the protruding portion of the honeycomb structure with an acid-resist and finally immersing the honeycomb structure in an aqueous acid etchant solution.

5. In a process of chem-milling honeycomb structures the steps of forming a geometrical figure from a wax body to conform to the shape of the desired workpiece, pressing the honeycomb structure downward on the wax-like body while the same is supported on a work surface, and finally placing the honeycomb structure with the wax-like body imbedded therein in an aqueous etchant bath.

6. In a chem-milling process for honeycomb structures the steps of forming a wax-like body into a geometrically shaped mass conforming to the profile of the workpiece desired, pushing the honeycomb structure downwardly over the wax-like body so that the wax extends into the cells thereof in substantially the same shape it assumed after formation, placing the honeycomb structure with the wax-like body therein in an acid aqueous etching solution and finally withdrawing the honeycomb structure and removing the wax-like body by the application of heat thereto.

References Cited in the file of this patent

UNITED STATES PATENTS

| | | |
|---|---|---|
| 393,867 | Tompsett | Dec. 4, 1888 |
| 2,107,294 | Griswold | Feb. 8, 1938 |
| 2,359,302 | Curtis | Oct. 3, 1944 |